United States Patent Office 3,099,569
Patented July 30, 1963

3,099,569
SILICONE-COATED FRIT USED IN
DECORATING GLASSWARE
Ray Andrews and Francis M. Moore, Washington, Pa.,
assignors to B. F. Drakenfeld & Company, Inc., Washington, Pa., a corporation of New York
No Drawing. Filed Jan. 11, 1961, Ser. No. 81,918
8 Claims. (Cl. 106—49)

This invention relates to the decoration of glassware with glass enamels or glazes, commonly termed in the trade glass colors. These are finely ground frits the composition of which is generally stated in terms of oxide contents as determined by analysis. These frits are commonly oxides of lead and silica with varying amounts of a number of other constituents in amounts balanced to give desired properties such, for example, as a particular coefficient of linear expansion and maturing temperature, as is well known. When matured by firing these glass colors, or enamels, form a glossy adherent coating upon the glass article. A typical example of a glass enamel frit is as follows:

| | Percent |
|---|---|
| Lead oxide | 54.0 |
| Silicon dioxide | 33.0 |
| Sodium oxide | 2.6 |
| Boric oxide | 2.0 |
| Cadmium oxide | 2.8 |
| Titanium dioxide | 2.2 |
| Zirconium oxide | .8 |
| Sodium fluoride | 2.6 |

The frits used for glass colors are made by a practice that has been used for many years. It involves dry mixing the raw materials for the frit and heating the batch to produce a homogeneous melt that is run into water to solidify and granulate it. The thus granulated material is then ground in a ball mill, generally in a water medium, and the finely ground frit is then dried and sieved.

Such frits may be colored as a result of constituents of the frit. More commonly, however, color is supplied by so-called mill additions. These are coloring substances that are ground in the ball mill with the granulated frit. A large variety of colors are supplied by such mill additions. For example, titanium dioxide as a mill addition to a clear frit will provide a white enamel, cadmium sulfide selenide can be used to provide a red enamel, while a black pigment suitable as a mill addition can be supplied by calcining together approximately equal parts of cobalt oxide, chrome oxide and iron oxide. Many other pigments are used similarly as mill additions.

These enamels are applied to glassware, such as bottles, in the form of a suspension in a fluent medium, as by spraying or brushing the suspension, or by forcing the suspension by a squeegee through a patterned screen stencil. Two practices are common, namely, cold color and hot color. In cold color practice the glass color is suspended in a so-called squeegee oil and applied unheated, i.e. at ambient temperature. A variety of squeegee oils are used, the particular composition often depending on preferences of users or upon desired characteristics, as to provide good leveling off, or upon the ability to volatilize the oil constituents completely and without carbonization during maturing of the color, and related factors.

Many squeegee oils are basically a solution of ethyl cellulose in pine oil and, as a matter of fact, a squeegee oil for a single color application can be just this. A typical squeegee oil composition which would be suitable for bottle decoration would consist of

| | Parts |
|---|---|
| Pine oil | 80 |
| Ethyl cellulose | 2 |
| Staybelite Resin | 20 |
| Rosin amine D | 5 |

Rosin Amine D is a fungicidal agent sold by the Hercules Powder Co. Staybelite Resin is a hydrogenated rosin sold by the same company. Another typical squeegee oil would be

| | Parts |
|---|---|
| Pine oil | 65 |
| Ethyl cellulose | 2 |
| Abalyn | 15 |

Abalyn is an amber-colored liquid ester of rosin sold by the Hercules Powder Co.

Although much of glassware decoration has been for many years done by the cold color practice, this is open to the economic disadvantage that where more than one color is to be applied it is necessary to dry each color application, except the last, before the next one can be applied because otherwise the decorative effect would be impaired due to smearing of the wet applied color, or to intermingling of two or more colors. This necessity in multi-color work of passing the articles through a drying oven before the application of a succeeding color has involved the expense of installation and operation of those ovens which require substantial floor space in addition to that occupied by the individual color applying devices, and it resulted in extended processing time.

Hot color practice is typified by Patent No. 2,682,480 granted on an application filed by one of the present applicants. In such hot color practice the glass color is dispersed in a vehicle the composition of which is such that the composition is solid at normal room temperatures but can melted to prepare the composition for application to an unheated glass surface so that when applied, as through a screen stencil, the composition solidifies promptly. In consequence of these characteristics it is thus possible to apply two or more colors immediately one after one another without intermediate drying. Thus the hot color process eliminates the necessity for intermediate drying ovens and results also in great economy of floor space and equipment cost, and greatly reduced processing time as compared with the cold color practice.

The vehicles used for hot color work are such as to be volatilizable prior to fusion of the enamel frit without leaving any objectionable residue while maintaining sharpness of the applied decoration upon fusion of the frit. A typical hot color composition comprises in addition to the enamel frit a thermoplastic resin, a solvent for the resin, and a wax in excess of its solubility in the composition at normal room temperatures, these constituents being proportioned to supply the characteristics just stated.

The aim in the use of these glass colors, or enamels, is that the applied designs (whether symbols, letters, or other characteristics) when matured shall be sharply defined with smooth, usually glossly, highly uniform surfaces. For many years the trade has been plagued at times with cracking or crazing of the enamel during firing, or maturing, a phenomenon known as "crizzle." This is not encountered with hot color alone but it is commonly met with in connection with cold color as a multiple coat, or applied over a hot color coat.

Experience has shown that crizzle is most likely to be encountered at times of low barometric pressure or high humidity, and especially on rainy days, or under conditions which retard the movement of combustion products from a lehr to and out of its stack. The problem of crizzle is particularly aggravated by the printing of cold color over hot color as well as resulting from attempts to increase through-put of decorated ware, as by operating lehrs faster or more heavily loaded. Up to the time of this invention no solution has been found, so far as we are aware, for consistently producing under all conditions ware decorated with glass colors, or enamels, without crizzling.

It is among the objects of this invention to provide glass enamels for the cold decorating of glassware which produce fired patterns without crizzle, and which may be prepared without requiring essential changes in existing practices of making them or in the use of them.

A further object is to provide a simple and easily practiced method of preparing non-crizzling glass enamels in accordance with the foregoing object which is applicable to glass enamels generally, and does not undesirably increase their cost.

Still another object is to provide a method of cold decorating glassware with glass enamels to provide non-crizzled fired enamel patterns.

The invention is predicated upon our discovery that its stated objects are attained by coating glass enamel frit particles with dimethylsilicone fluids. Such fluids are well known commercial products. They are heat stable liquids that are obtainable in a wide range of viscosities. They are clear liquids with an oily feel that are very stable at elevated temperatures and which are extremely inert chemically as well as being nontoxic. A variety of dimethylsilicone fluids are available under the designation "200 Fluids," while others are available as "G. E. Silicone Oils." They are soluble in a wide variety of common solvents, and they are readily emulsified.

Although the dimethylsilicone fluid may be applied in various ways to the dried ground enamel frits, we now prefer to add it as an aqueous emulsion during ball milling of the frit to prepare it for use. This ensures thorough coating of all of the particles without the necessity for a separate coating operation.

Extremely small amounts of silicone fluid suffice for the purposes of the invention. In fact, the surface film of silicone fluid carried by the individual particles is so thin as to be virtually undetectable. Although, as indicated, there are a variety of dimethylsilicone fluids available for practicing the invention, we have found that excellent results are to be had by a fluid of this type designated as Silicone L–45, or by a 35 percent water emulsion of it sold as LE–450.

We have found that eminently satisfactory results in inhibiting crizzling are to be had by adding during ball milling of the frit in water about one percent of such an emulsion based upon the weight of the frit, or by adding to the water in which the frit is ball milled an equivalent weight of the silicone itself. Larger amounts may be used, say up to 4 or 5 percent of such an emulsion, based on the frit weight, or an equivalent amount of the fluid itself. For many purposes from about 0.3 to 2.0 percent of the silicone, based on the frit weight suffices. Although larger amounts might be used, they would ordinarily be uneconomical, and it might interfere in some instance with proper response of the glass enamel in the firing operation.

Other dimethylsilicone fluids that we have found to give at least some improvement in combatting crizzling are identified as XLE–420, XL–42 and X–520.

The thus treated glass enamels are used without change in existing cold enameling practices. Thus, they are applied to glassware in accordance with existing decorating practices to form desired patterns, being either applied cold or as the final color applied cold over one or more hot applied colors in hot enameling practices of the type described above. The glass article with its applied enamel is then fired at a temperature to mature the enamel which occurs without the development of crizzle. The firing temperature will depend upon the frit composition as is well known in the art. Not only does the invention thus result in the production of perfect fired patterns but also the invention permits speeding up the lehrs or loading them more heavily than is possible with glass enamels not treated in accordance with the invention. Moreover, the maturing of the enamels provided by this invention is not adversely affected by variations of humidity.

As an example, there may be prepared in the manner described above a frit of the following composition:

| | Percent |
|---|---|
| Lead oxide | 48.6 |
| Boric oxide | 6.9 |
| Silicon dioxide | 25.0 |
| Cadmium oxide | 3.6 |
| Sodium oxide | 3.2 |
| Titanium dioxide | 2.4 |
| Zirconium oxide | 6.7 |
| Sodium silica fluoride | 3.6 |

A red pigment is made by mixing together 4½ lbs. of cadmium sulfide and 1 lb. of selenium. The mixture is heated to about 1200° F. with constant stirring. The two materials will react to form a bright red pigment 12 lbs. of which are wet milled with 88 lbs. of the foregoing frit. At the end of the grinding operation 1 lb. of the above mentioned silicone emulsion LE–450 is added and mixed in thoroughly. The milled material is removed and dried, and the dried color is mixed with standard squeegee oil in the ratio of about 4 lbs. of powder to 1 lb. of the squeegee oil. The mixture is passed through a 3-roll paint mill to produce a smooth, uniform dispersion. This color is then ready for use, for instance to apply as a second color over a print of hot white or cold white. After application, the coated article is fired by placing it in a lehr at an entering temperature of about 400° F. In a period of about 20 minutes the temperature is carried up to about 1140° F. and held for about 8 to 10 minutes after which the article is allowed to cool to room temperature in about one hour and 30 minutes. Even though fired in an atmosphere containing a high percentage of water vapor the color thus prepared will fire with a smooth surface and a high gloss. However, using the same frit and the same red pigment and otherwise proceeding in the same manner except that the silicone emulsion is omitted, the overlying red color tends to crack, or crizzle, so that the first color, in this example white, shows through. This disruption of the surface appears as fine, irregular lines or tears, or as craters, in the color. Regardless of the exact nature of the disrupted surface, such decorated items are not commercially acceptable and therefore represent a production loss.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of preparing a frit based glass enamel the step comprising coating the frit particles with a minor proportion by weight of a dimethylsilicone fluid and thereby rendering the enamel non-crizzling during firing on a glass base.

2. Method according to claim 1, said fluid being applied as an aqueous emulsion.

3. Method according to claim 1, said fluid being applied in an amount from about 0.3 to 2.0 percent based on the frit weight.

4. In a method of preparing a frit based glass enamel the steps comprising milling the frit in water, adding to the mill a minor proportion by weight of the frit of a dimethylsilicone fluid, and drying the milled frit.

5. In a method of decorating glassware the steps comprising applying to a glass base an unheated suspension in a volatilizable liquid of frit the particles of which are coated with a dimethylsilicone fluid to form a desired pattern on the glass base, and firing the base and applied frit at a temperature to fuse the frit with production of a non-crizzled pattern.

6. Method according to claim 5, said frit being coated with about 0.3 to 2.0 percent by weight of said fluid.

7. A glass enamel frit the particles of which are coated with a dimethylsilicone fluid.

8. Frit according to claim 7 coated with about 0.3 to 2.0 percent by weight of said fluid.

References Cited in the file of this patent

UNITED STATES PATENTS

| | | |
|---|---|---|
| 2,881,064 | Rankin | Apr. 7, 1959 |
| 2,972,543 | Beals et al. | Feb. 21, 1961 |

FOREIGN PATENTS

| | | |
|---|---|---|
| 643,964 | Great Britain | Oct. 4, 1950 |
| 644,337 | Great Britain | Oct. 11, 1950 |